Nov. 12, 1968 P. L. M. VAN BERKEL 3,410,991

READING DEVICE FOR AN INFORMATION BEARER

Filed Nov. 30, 1960 3 Sheets-Sheet 1

INVENTOR.
PETRUS LUDOVICUS MARIA VAN BERKEL
BY Hugh A. Kirk
ATTORNEY

INVENTOR.
PETRUS LUDOVICUS MARIA VAN BERKEL
BY
[signature]
ATTORNEY

READING DEVICE FOR AN INFORMATION BEARER

Filed Nov. 30, 1960 3 Sheets-Sheet 3

INVENTOR.
PETRUS LUDOVICUS MARIA VAN BERKEL

BY Hugh A. Kirk
ATTORNEY

United States Patent Office 3,410,991
Patented Nov. 12, 1968

3,410,991

READING DEVICE FOR AN INFORMATION BEARER

Petrus Ludovicus Maria van Berkel, Voorburg, Netherlands, assignor to De Staat der Nederlånden, ten Deze Vertegenwoordigd Door de Directeur-Generaal der Posterijen, Telegrafie en Telefonie, The Hague, Netherlands Filed Nov. 30, 1960, Ser. No. 72,666
Claims priority, application Netherlands, Dec. 8, 1959, 246,215
13 Claims. (Cl. 235—61.11)

The invention relates to a reading device for an information bearer provided with horizontal rows of characters each supplemented by code marks, the reading spots for a simple scanning of a character being so arranged in horizontal rows and vertical columns that a self-checking code is obtained and the moving direction of the information bearer at the reading spot being horizontal.

Such a reading device is known from the U.S. patent application No. 828,646, filed July 21, 1959, and now Patent No. 3,257,545. The output terminals of such a reading device are connected to a data processing machine, such as an electronic accounting machine, a converter to paper tape or magnetic tape or a high-speed telegraph system. Though on the information bearer described in the said patent application, the vertical parts of the stylized characters are strongly accentuated in order to obtain a suitable tolerance in a vertical direction, this tolerance still proves to be insufficient in practice. This tolerance must be large, because: (1) the character may be printed too high or too low; (2) the character may be printed multilated; and/or (3) the information bearer may be moved not quite horizontally.

Now the object of the invention consists in obtaining a large vertical tolerance, by an arrangement in which the scanning of each character is effected plurally at spots lying one above the other, at the most at distances corresponding to the original tolerance, the result of each reading of a character being checked for its validity and each valid reading being accepted.

The invention will now be elucidated with reference to FIGURES 1 and 2.

FIG. 1 shows a simple reading station with reference to which the check of the reading of a character will be explained.

Figure 1:
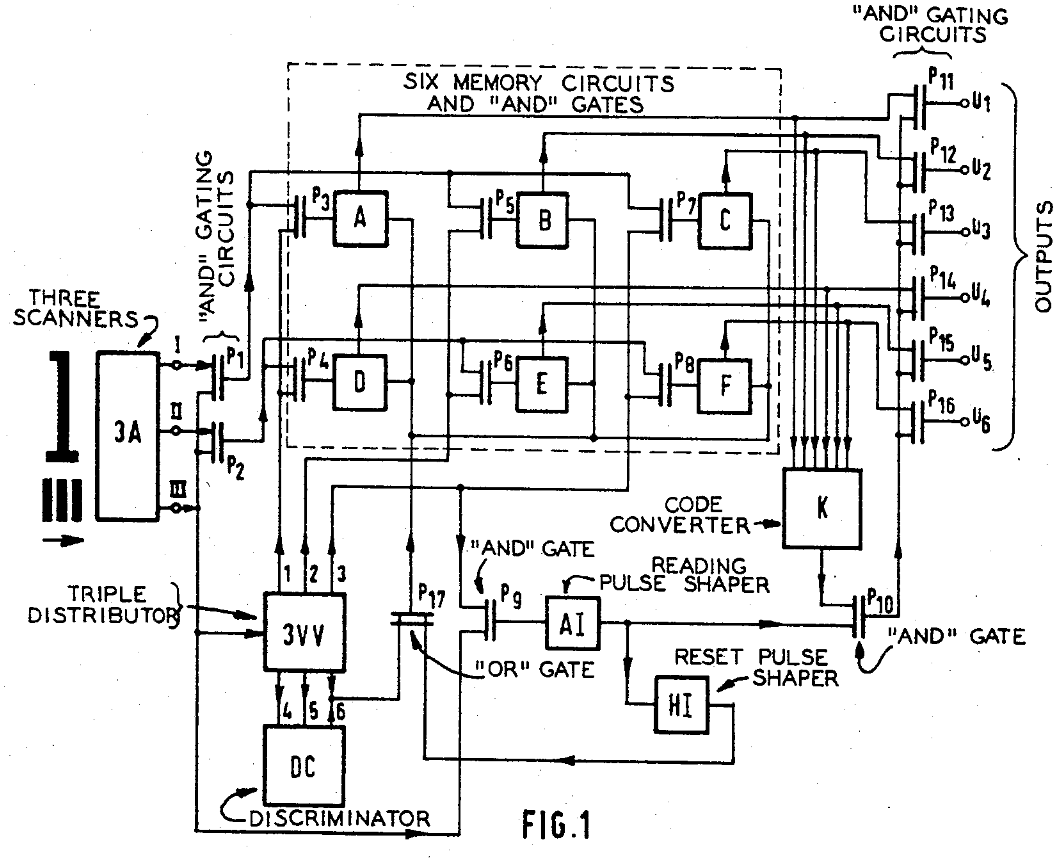
FIG. 1 illustrates a block diagram of a simple reading device containing a checking circuit.

It contains three scanners 3A, 6 memory circuits A, B, C, D, E and F, a code converter K, a triple distributor 3VV and a discriminator DC, a reading pulse shaper AI and a reset pulse shaper HI, gating circuits P1 to P17 connecting the various parts together and to the output terminals U1 to U6.

On the information bearer to be read, the characters may be printed in ordinary ink and in that case the scanners must be cells sensitive to light, but they may also be printed in magnetic ink and in such a case the scanners must be sensitive to magnetism, such as reading heads having an air-gap perpendicular to the moving-direction of the information bearer. The latter may be moved in a straight line, but it may also be pressed mechanically or pneumatically against a cylinder rotating around its axis, this axis being parallel to the vertical columns of scanning spots. The reading device shown is started from the scanner output terminals I and II, which scan simultaneously a spot in the upper half and in the lower half, respectively, of a character, these scannings being effected for each signal at three successive spots in a horizontal row. The scanner with output terminal III successively scans three code marks associated with the characters, thus the situation of the first-mentioned scanning spots in a horizontal sense being determined at the same time. The fact is that the scanning results of the scanners with output terminals I and II are only passed on by "and"—circuits P1 and P2 at the moments when the scanner with output terminal III scans a code mark, that is, when there also appears a marking signal at terminal III. The positions of the scanning spots are such that a self-checking code is obtained.

The optical or magnetic scanners deliver pulse-shaped output voltages at their output terminals I, II and III, as soon as they find the information bearer to be optically or magnetically marked. So at three successive instants two bits of information are obtained, which are stored in six memory circuits, A, B, C, D, E and F in behalf of a check for the validity of the reading. A triple distributor 3VV has been provided to control this storage. The marking signals originating from the scanner with output terminal III are led to the input terminal of this distributor and on arrival of each signal the distributor 3VV passes to its next state, due to which its rails 1, 2 and 3 successively assume a characteristic potential. If there were *n* scanning moments for each character, an *n*-fold distributor would be required, in order that after the reading of each signal the distributor is back into its initial state.

When the first marking signal appears, the first pair of bits originating from the scanner terminals I and II are led via "and" gating circuits P1 and P2 to "and" gating circuits P3 and P4. This first signal also puts the triple distributor 3VV in the state in which there is a voltage on rail 1, as a result of which the said bits are led now via the last-mentioned gating circuits P3 and P4 to the memory circuits A and D, respectively. Circuits A to F may be normal memory circuits in which each circuit contains two transistors e.g. *a* and *b*. In one state of the circuit when transistor *a* is conducting, transistor *b* is nonconducting; and in the other state of the circuit, when transistor *b* is conducting, transistor *a* is nonconducting.

When the second marking signal appears, the second pair of bits, again after having passed the "and" gating circuits P1 and P2 are led, due to the characteristic voltage present on rail 2 via the "and" gating circuits P1 and P2 are led, due to the characteristic voltage present on rail 2 via the "and" gating circuits P5 and P6, to memory circuits B and E. In like manner, when the third marking signal appears, the last pair of bits, again after having passed the "and" gating circuits P1 and P2 are led, due to the characteristic voltage present on rail 3, via the "and" gating circuits P7 and P8 to memory circuits C and F.

When the 6 bits have thus been stored in memory circuits, it can be tested whether these bits constitute together a valid code and may be accepted for further processing. This test may not be effected earlier than at this moment, because:

(1) Valid combinations of bits may also be formed for short intervals when the information is being led to the memory circuits;

(2) A spurious pulse or a pair of spurious pulses may appear at any of the scanner output terminals I and/or II and III, as occasioned by the edge of the paper, folds in the paper, perforations, etc., which pulses could also yield valid combinations of bits. Such combination would be wrongly accepted then.

So the test for a valid code is initiated by means of the third marking signal, which is singled out as it passes through an "and" gating circuit, P9, to which the marking signals are applied on one hand and the voltages of rail 3 of the triple distributor 3VV on the other hand. A normal pulse shaper, the scanning pulse shaper AI, derives from the trailing edge of this third marking signal a pulse which is short with respect to the interval between two successive character readings. This scanning pulse determines the contingent moment of passing the code.

The check for the validity of the code stored in the memory circuits A to F is carried out by means of a circuit K. This may be a code convertor built up in the usual way of "and" and "or" gating circuits. In the case described it will have six input terminals connected to the respective output terminals of the six memory circuits. Further it possesses one pair of output terminals, one of which is provided with a reference potential (not shown). The code convertor K must be so carried out that only in case the voltages applied to its input terminals correspond to a valid code, a voltage appears between its output terminals. Only in that case too an "and" gating circuit P10 will pass the above-mentioned scanning pulse, which then opens six "and" gating circuits P11 to P16, due to which the information stored in the memory circuits A to F is passed on to the output terminals U1 to U6 inclusive.

If the memory circuits can only be changed over from the normal state to the second state by the pulses corresponding to the bits, and not conversely, it will be necessary to have the trailing edge of the scanning pulse in another normal pulse shaper, the reset pulse shaper HI, generates a pulse which returns the six memory circuits A to F to the normal condition before the next character is introduced. This reset pulse is applied to input terminals of the six memory circuits, notably if the triple distributor 3VV is provided with a discriminator according to the United States patent application Ser. No. 63,741 filed Oct. 20, 1960, via an "or" gating circuit P17. The object of such a discriminator is as follows. As has been mentioned already, the scanners 3A can also deliver pulses occasioned by the edge of the paper, folds in the paper, perforations etc. If due to such a spurious pulse the threefold distributor 3VV passes from its initial state to the next state, a pulse is applied via a rail 4 to the discriminator DC. If after the normal lapse of time between two marking signals there appears no further pulse from output terminal III, the discriminator DC puts the distributor back into the initial state by applying a pulse via rail 6. If there appears a pair of spurious pulses, a pulse is also applied via rail 5 to discriminator DC, which will reset the distributor in the initial state again via rail 6. After the appearance of one of two spurious pulses the pulse applied to rail 6 also serves as a reset pulse. Via the "or" gating circuit P17 it will, if necessary, restore the memory circuits to normal in the same way as the normal reset pulse.

Figure 2:
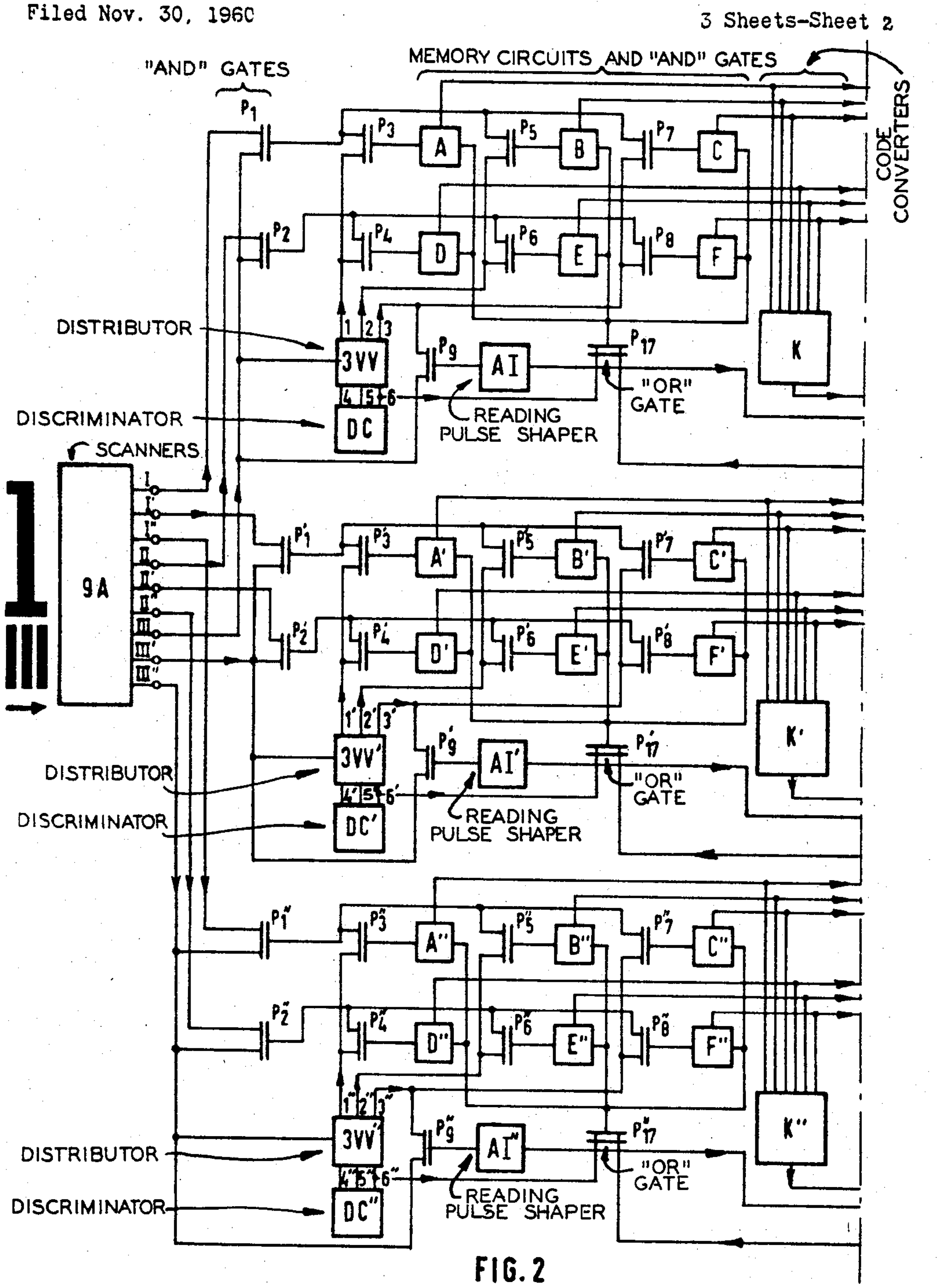
FIGS. 2 and 2′ illustrate a block diagram of a multiple reading device containing checking circuits.
Figure 2:
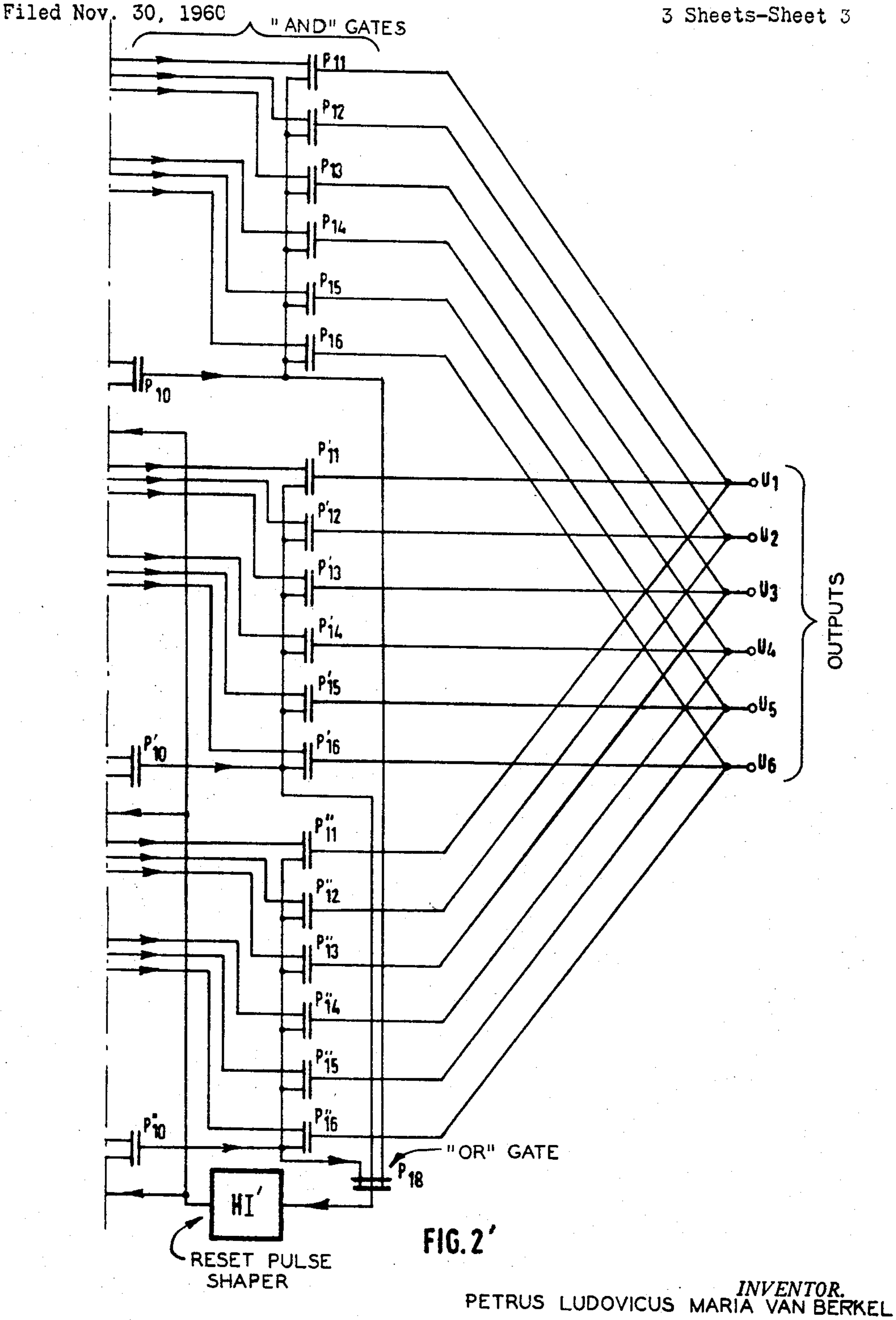

The vertical tolerance attending the reading of characters can be increased by applying multiple scanning by means of a reading device according to FIGS. 2 and 2′, which consists in a combination of three reading devices according to FIG. 1, which have one common reset pulse shaper HI′ (FIG. 2′). As in the case of FIG. 1 the scanners 9A in FIG. 2 with output terminals I and II scan simultaneously a spot in the upper half and in the lower half of the character.

The fact is that at the moment when the scanner with output terminal III finds a code mark the scanning results are passed on via "and" gating circuits P1 and P2 in FIG. 2, and the storage of the six bits is as has been described in connection with FIG. 1. However, a second set of scanners, I′, II′ and III′ respectively, has been provided above the middle or normal scanners I, II and III, notably at the most at a distance corresponding to the original tolerance. Further a third set of scanners, I″, II″ and III″ respectively, have been provided below the scanners I, II and III, again at the most at a distance corresponding to the original tolerance. The scanning results of the two additional sets of scanners too are stored in the same way in memory circuits A′–F′ and A″–F″. If a valid code is found at the output terminals of code converter K a scanning pulse will be passed on via the "and" gating circuit P10 and the information stored in the memory circuits A–F will be passed on by the "and" gating circuits P11–P16 to the 6 output terminals U1–U6 of the reading device. In the same way, if a valid code is found at the respective output terminals of code convertors K′ and K″, a scanning pulse will be passed on by "and" gating circuits P10′ and P10″, respectively, and the information stored in memory circuits A′–F′ and A″–F″, respectively, will be passed on by "and" gating circuits P11′–P16′ and P11″–P16″, respectively, to the six output terminals U1–U6. So if only one set of scanners has delivered the correct code the information is applied to the data processing machine.

For the sake of completeness be it mentioned that it is conceivable that due to an incorrect scanning from more than one scanner in a set of scanners a valid code is obtained, which, if passed on alone, would result in the processing of a wrong character in the machine connected to the output terminals U1–U6. But in such a case the character will probably be scanned correctly by another set of scanners, so that there appear two different valid codes at output terminals U1–U6. In such a case the machine will receive no correct code. This is to be preferred to applying to the machine some valid code anyhow, as is done in the reading device according to FIG. 1, since in that way an incorrect character may be processed unobserved.

As in the reading device according to FIG. 1 a reset pulse shaper HI′ (see FIG. 2′) may be required to deliver a pulse which, via the "or" gating circuits P17, P17′ and P17″ puts back all the memory circuits in the normal state. The input terminal of this pulse shaper HI′ is connected to an "or" gating circuit P18, which lets pass a pulse, as soon as the "and" gating circuit P10 and/or P10′ and/or P10″ lets pass a scanning pulse. In this case too the return of the memory circuits to the normal state, after the occurrence of spurious pulses, may be effected by means of a pulse applied to rail 6, 6′ or 6″ of discriminator DC, DC′ or DC″, respectively.

While I have illustrated and described what I regard to be the preferred embodiment of my invention, nevertheless it will be understood that such is merely exemplary and that numerous modifications and rearrangements may be made therein without departing from the essence of the invention I claim:

1. A reading device for an information bearer provided with horizontal rows of characters, said device comprising:

(a) means (I, I′, I″ and II, II′, II″) for simultaneously scanning each element of each character of said bearer horizontally at a simultaneous plurality of vertical spots based within the original vertical tolerance of each character on said bearer, (b) AND gate means connected to said scanning means for detecting said simultaneously scanned spots, (c) means (A–F) connected to said gate means for storing the information scanned from each character, (d) means (K) connected to said storing means for checking the stored information for validity, and (e) means (P10–P16) connected to said checking means for transferring valid stored information from said storing means.

2. A device according to claim 1 wherein said information bearer includes code marks associated with each character, and wherein said scanning means includes means for simultaneously scanning said code marks with said vertical spots associated with each character, and wherein said storing means includes means (AI) controlled by said code marks for controlling said transferring means.

3. A device according to claim 2 including means (HI) connected to said means for controlling said transferring means for resetting said storing means after transfer of said valid stored information therefrom.

4. A device according to claim 1 wherein said scanning means includes a plurality of vertically spaced pairs of spots (I–II, I'–II', I''–II'') within the original vertical tolerance for each character.

5. A device according to claim 1 wherein: each said character comprises a plurality of horizontally spaced elements; wherein said information bearer includes self-checking code marks associated with each said character on said bearer; wherein said scanning means includes means for simultaneously scanning said associated code marks and said vertical spots; and wherein said storing means includes a distributor means (3VV) connected to said scanning means for said code marks for controlling said storing means for each element of each character.

6. A reading device for an information bearer provided with horizontal rows of characters each supplemented by self-checking code marks, said device comprising:

(a) means (I, II and III) for scanning said bearer horizontally at a simultaneous plurality of vertical spots based within the original vertical tolerance for each character and within said code marks associated therewith on said bearer, (b) AND gate means (P1–P2) connected to said scanning means for said code marks for controlling the detection of the scanned character information, (c) means (A–F) connected to said gate means for storing said information scanned from each character, (d) means (K) connected to said storing means for checking said stored information for validity, and (e) means (P10–P16) connected to said checking means for transferring valid stored information from said storing means.

7. A reading device according to claim 6 wherein said storing means includes a pulse shaping means (AI) controlled by said scanning means for said code marks for controlling said transferring means.

8. A device according to claim 7 including means (HI') connected to said controlling means for resetting said storing means after the transfer of said information from said storing means.

9. A device according to claim 6 wherein said characters on said bearer each comprise a plurality of horizontally spaced elements, each of which characters has its associated self-checking code marks and each of which elements and its associated code mark is scanned at a simultaneous plurality of vertical spots, and wherein said storing means includes distributor means (3VV) controlled by said means for scanning said code marks for controlling the successive storing of said elements in said storing means for the storage of one character.

10. A device according to claim 9 including means (P17) controlled by said distributor means for resetting said storing means before the scanning of the next succeeding character.

11. A reading device for an information bearer provided with at least one character, each character comprising a given plurality of elements, said device comprising:

(1) separate groups (I, I', I'') (II, II', II'') (III, III', III'') of *n* scanning means for scanning each element of said character, *n* being a whole positive integer greater than two, and said *n* scanning means being arranged in the same order in each group; whereby the first scanning means of each group forms one set (I, II, III) of scanning means, the second scanning means of each group forms a second set (I', II', III') of scanning means, and so on for *n* sets of scanning means, (2) separate means (3VV, 3VV', 3VV'') connected to each scanning means of one of said groups for controlling the simultaneous scanning of all said elements by all the scanning means of its associated set of scanning means, (3) means (A–F, A'–F', A''–F'') connected to each scanning means for storing the information from any one character, (4) separate means (K, K', K'') connected to a set of said storing means corresponding to each set of scanning means for checking the correctness of the stored information in that set of storing means, and (5) means (P10, P'10, P''10) (U1–U6) connected to all said checking means for transferring the stored information of any correctly checked set of storing means.

12. A device according to claim 11 wherein said information bearer has a horizontal row of a plurality of characters, and wherein the elements in said characters are arranged in columns transverse of said row, and wherein said scanning means are aligned in line with said column.

13. A device according to claim 12 wherein said one group to which said separate means for controlling the simultaneous scanning of all the elements is the *n*th group.

References Cited

UNITED STATES PATENTS

| | | | |
|---|---|---|---|
| 3,005,189 | 10/1961 | O'Brien | 340—146.1 |
| 3,078,448 | 2/1963 | O'Brien | 340—174.1 |
| 2,944,248 | 7/1960 | Auerbach et al. | 235—153 |

DARYL W. COOK, *Primary Examiner.*

UNITED STATES PATENT OFFICE

CERTIFICATE OF CORRECTION

Patent No. 3,410,991 November 12, 1968

Petrus Ludovicus Maria van Berkel

It is certified that error appears in the above identified patent and that said Letters Patent are hereby corrected as shown below:

Column 2, line 43, beginning with "P1 and P2" cancel all to and including "gating circuits" in line 45, same column 2.

Signed and sealed this 17th day of March 1970.

(SEAL)
Attest:

Edward M. Fletcher, Jr.
Attesting Officer

WILLIAM E. SCHUYLER, JR.
Commissioner of Patents